Sept. 29, 1931.  G. E. WEAVER ET AL  1,825,495
JACK
Filed June 3, 1927      3 Sheets-Sheet 1
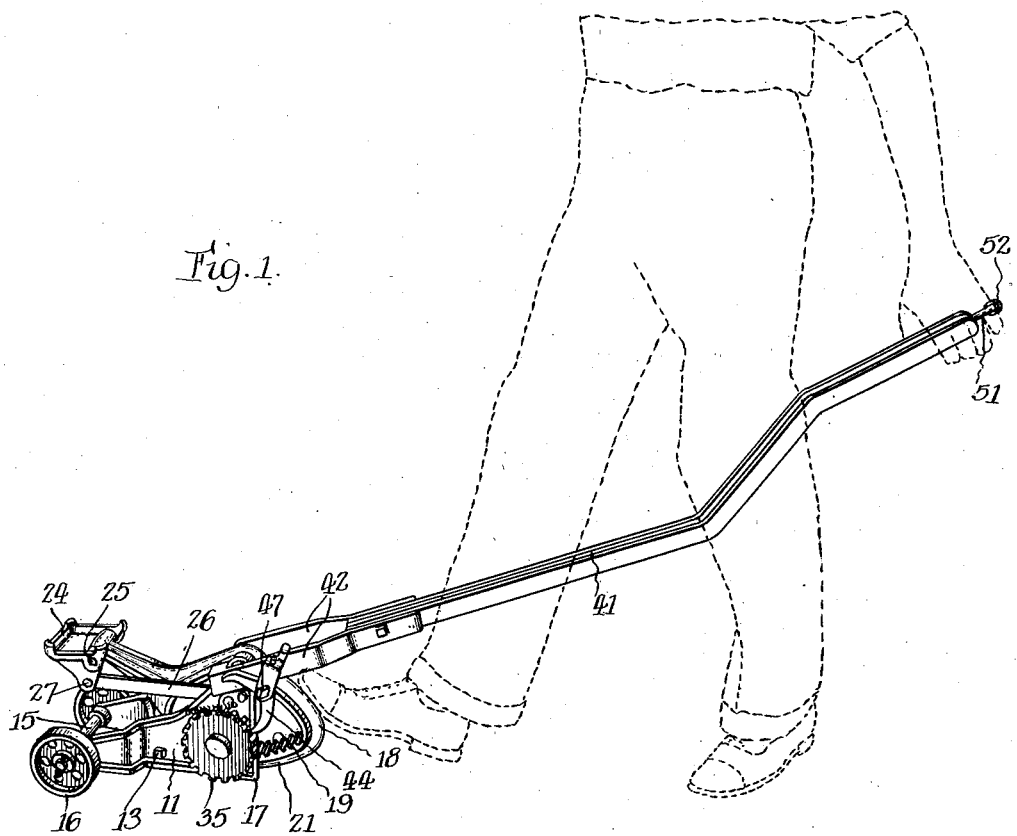
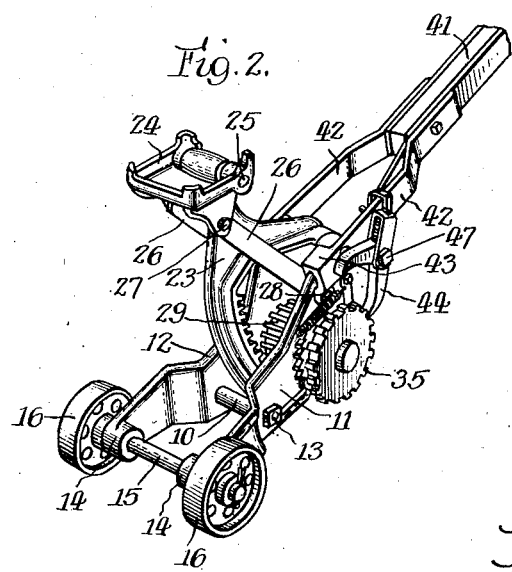

Sept. 29, 1931.  G. E. WEAVER ET AL  1,825,495
JACK
Filed June 3, 1927    3 Sheets-Sheet 2
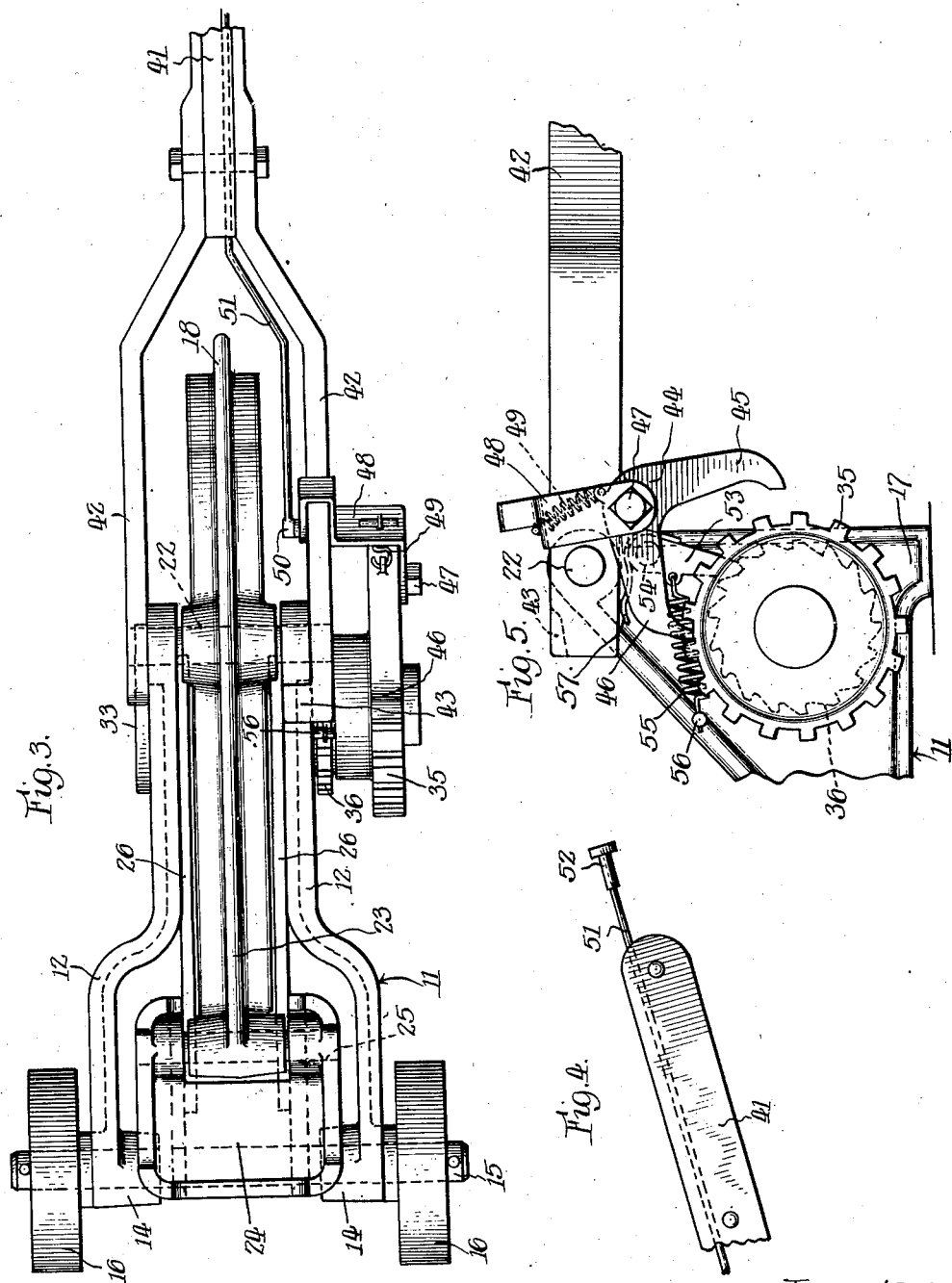

Sept. 29, 1931.  G. E. WEAVER ET AL  1,825,495
JACK
Filed June 3, 1927  3 Sheets-Sheet 3
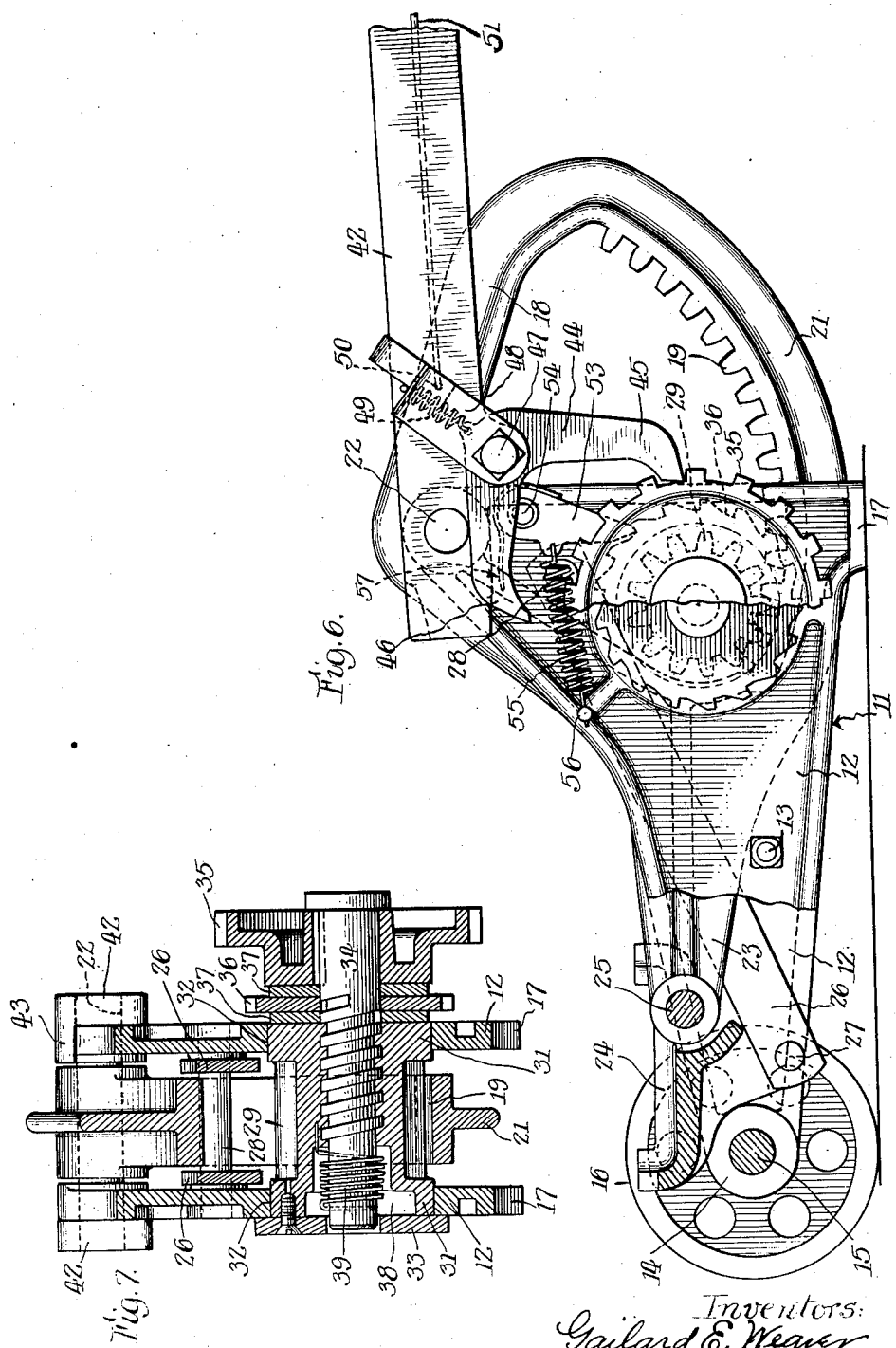
Inventors:
Gailard E. Weaver
Harry C. Buffington
By Walter M. Fuller Atty Patented Sept. 29, 1931

1,825,495

UNITED STATES PATENT OFFICE

GAILARD E. WEAVER AND HARRY C. BUFFINGTON, OF SPRINGFIELD, ILLINOIS, ASSIGNORS TO WEAVER MANUFACTURING COMPANY, OF SPRINGFIELD, ILLINOIS, A CORPORATION OF ILLINOIS

JACK

Application filed June 3, 1927. Serial No. 196,184.

The present invention relates to jacks, and more particularly to those of the gear type such as are frequently employed for tire-changing in connection with vehicles and for other work where it is necessary to raise a wheel quickly from the floor to permit the tire-change or for performing some other useful function.

A leading object of the invention is to provide a jack of this character which can be constructed economically and which will occupy but little space when not in use, and while in a sense the jack is one which is actuated by a step-by-step movement, it is constructed to function in such a way that it may be lowered one or more steps at a time without involving the employment of any complicated apparatus.

It is an additional aim of the invention to supply a jack which will descend quite low and still have an unusually high lift or elevating action, which is essential in jacking up the axle of an automobile equipped with the present-day, large-diameter cross-section, balloon tires, and raising the axle high enough so that the tire may be clear of the floor for interchanging purposes.

To permit those skilled in this art to understand the invention from its various aspects, both structurally and functionally, in the accompanying drawings forming a part of this specification, and throughout the several views of which like reference characters have been employed to designate the same parts, a present desirable and preferred embodiment of the invention has been illustrated in detail, the description of the same being presented below.

In these drawings,—

Fig. 1 illustrates in perspective the manner of initially actuating the jack by the foot of the operator to cause the load-engaging saddle to rise quickly to assume the load, or, rather, to reach a position ready to engage the load;

Fig. 2, also in perspective, indicates the handle raised sufficiently so that the jack, when not in use, may be wheeled along the floor or ground on its carrying-wheels, its supporting-foot, which bears on the floor during the load-elevating action, being lifted off of the floor during such travel of the jack on its wheels only;

Fig. 3 is a plan view of the jack with a portion of its handle omitted;

Fig. 4 shows the outer end of the handle and its associated rod;

Fig. 5 is a detail view of the ratchet mechanism;

Fig. 6 is a fragmentary side elevation of the jack with some of the parts broken away; and Fig. 7 is a cross-section through the transverse screw-shaft.

By reference to these drawings, it will be perceived that the new and improved structure includes a main-frame, characterized as a whole, composed of a pair of offset side frames or castings 12, 12 cross-connected together and held spaced apart intermediate their ends by a bolt 13 and an intervening sleeve 10, such separated members 12, 12 having bearings 14, 14 at their front ends for the accommodation of a transverse shaft 15 equipped at its opposite ends with carrying-wheels 16, 16, each such frame-element 12, at its other end, having a foot 17 adapted to bear on the ground or floor during the load lifting or lowering operation of the device.

An internal-gear segment-member 18, having the gear-teeth 19 on the upper side of its lower curved portion 21, is fulcrumed between the spaced frame-parts 12, 12 on a cross-shaft 22 supported in aligned bearings in such spaced elements, the member 18 having a forwardly-extended arm 23 on which a load-engaging saddle or seat 24 is hinged at 25, the substantial horizontality of which is maintained by a double-link 26, 26 pivoted at one end at 27 to a lower projection on the saddle, and pivoted at its other end at 28 on the frame.

Obviously, as the sector or segment is rocked about its fulcrum, the saddle will be correspondingly raised or lowered.

The gear-teeth 19 are in mesh with those of a pinion or gear 29 (see Fig. 7) having end journals 31, 31 revoluble and slidable lengthwise in bearings 32, 32 in the frame-elements 12, 12, a confining disc 33 being secured to one end of the gear and overlapping the outer side face of the corresponding bearing part of the side-frame.

Internally, the gear 29 is screw-threaded for the mating, threaded, central portion of a shaft 34, one protruding end of which has a ratchet-wheel 35 keyed thereon, a smaller ratchet-wheel 36 with slightly undercut teeth being free to turn on the shaft and having friction discs or washers 37, 37, likewise free to turn on the shaft, interposed between its opposite side faces and the inner face of the hub of the ratchet-wheel 35, on the one hand, and the adjacent end of the gear 29, on the other hand.

In a cavity 38 in the gear 29, a coiled spring 39 encircles an unthreaded part of the shaft, one end of which is fastened to the shaft, the opposite end being secured in the gear, whereby the spring tends to turn the gear on the shaft, and, by reason of the threaded engagement between the two, automatically takes up any slack in the friction means specified.

A handle 41, of any suitable length, has a bifurcated end 42 hinged or fulcrumed on the shaft 22 outside of the side-frames 12, 12, one of such handle-sections 42, having a lateral extension 43 overlying the adjacent side-frame, with the top edge of which it comes into contact to lift the feet 17, 17 off of the ground or floor when it is desired to easily roll the jack to a new position, but during the load elevating or lowering operation such lug 43 is out of contact with the side-frame.

A double-ended pawl 44, having two ends or fingers 45 and 46, is fulcrumed on the handle 41 at 47, such terminal parts 45 and 46 being each adapted to co-operate individually with the larger ratchet-wheel 35, a yoke 48 being pivoted or hinged on the same pin 47 and having a coiled, contractile spring 49 connected at its upper end to the yoke and at its lower end to the center part of the duplex pawl, that portion of the yoke extended over and down inside of the divided handle having a bent rod 51 hinged thereon at 50, the rod projecting beyond the free end of the handle, as presented in Fig. 4, where it is supplied with an operating knob 52.

From the foregoing, it will be obvious that by pushing in the rod 51 or by pulling it out, the yoke will be rocked manually to position the spring 49 to hold the one or the other pawl end 45 or 46 in co-operative relation with the companion actuating ratchet-wheel, the latter being turned, by whichever pawl end is active, during the down stroke only of the vertically oscillatory handle.

The holding ratchet-wheel 36 is supplied with a pawl or dog 53 fulcrumed at 54 on the frame 12, being pulled to its work by a coiled spring 55 secured at one end to the dog and fastened at its other end at 56 to the frame-element 12, such pawl also having a leaf-spring 57 fixedly mounted thereon, with an outstanding tail portion below the edge of the adjacent handle member 42, whereby, when the handle is raised somewhat above normal operating position, it will tension such spring, tending to retract the pawl from the ratchet-wheel as soon as the load on the appliance has been reduced sufficiently to permit such result.

The improved jack operates practically as follows:

Assuming that it is desired to raise a load, such as a part of an automobile for changing tires, the jack is pushed into proper position as beneath the vehicle-axle, with the feet 17 resting on the floor, pavement, or the like, the knob 52 is pulled out, thereby causing the spring 49 to rock the lifting pawl 45 into engagement with the ratchet-wheel 35 and to maintain it yieldingly in such relation, and, by means of the operator pressing with his foot on the segment-member 18, as pictured in Fig. 1, the saddle, without having recourse to the relatively-slow step-by-step but powerful elevating mechanism, is caused to ascend quickly until it strikes the axle, that is to say, until it engages the load.

During such preliminary raising of the saddle, the teeth of the ratchet-wheels ride idly under their companion dogs, as will be readily understood.

In order to lift the load step-by-step by the powerful pawl-and-ratchet mechanism, thereafter, the operator rocks the handle up and down, each descent of such handle causing a partial rotation of the ratchet-wheel 35 and the shaft 34 to which it is keyed with corresponding elevation of the load-saddle and load, and each upward swing permitting the pawl to engage a new tooth of the ratchet-wheel.

Before such elevating action begins, however, during the first part of the turning of the shaft, owing to the screw-connection between the shaft 34 and gear 29, the ratchet-wheel 35 is pulled inwardly squeezing the elements 36, 37, 37 between itself and the gear until the parts become sufficiently jammed or pressed together preventing further inward travel of the part 35, and thereafter the members 34, 35, 36, 37, 37 and 29 turn as a unit and the load is raised in the usual way through the customary functions of the alternately-acting, actuating and holding ratchet-wheels and their pawls.

During such step-by-step elevation of the saddle and load, the latter are held against descent, when the pawl 45 is raised to engage a new tooth, by reason of the established friction between the associated members and due also to the coaction of pawl 53 with its holding ratchet-wheel 36.

When it is desired to lower the load step-by-step, the knob 52 is pushed in, thereby rendering the pawl 45 inoperative and the pawl 46 active, and, accordingly, when the handle has been rocked down sufficiently to turn the screw-shaft enough to reduce the friction between the ratch-wheel 35 and the gear 29, through the intervening members, until it is slightly less than the load, then the latter by gravity will turn the gear 29 and the gear-segment 18, and the load and saddle will descend gradually, the remaining friction automatically increasing and acting as a brake to terminate the descent and at the same time preventing a sudden drop of the load.

When the ratchet-wheel 35 is thus turned to rotate the screw-shaft in the gear to lessen the friction, this is readily accomplished because the ratchet-wheel 36 is prevented from turning by its pawl and there is adequate friction between the parts to hold the gear 29 stationary until the screw-shaft has been turned enough to reduce the friction the required amount.

In this way, by the upward and downward movements of the handle, the load may be caused to descend step by step by reason of the alternate reduction and increase of the specified friction.

Stated a little differently, to lower the load, the operator by means of the handle reduces the friction to a point where the load is permitted to descend, but in so doing it gradually increases the friction to an amount which prevents further descent. Thereupon the operator again works the handle to lessen the friction whereupon a repetition of the stated actions occur. This is continued the necessary number of times.

After the load has been substantially lessened by such descent, as when the tire engages the floor, the operator may lift the handle above normal position, thus tensioning the leaf-spring 57, and, as soon as the load is sufficiently reduced to permit such spring to retract the pawl 53, it will do so, and the saddle will automatically drop to its lowermost position.

Obviously, the invention is not limited and restricted to the particular embodiment presented, and many more or less radical changes may be incorporated in the structure illustrated and described without departure from the heart of the invention as defined by the appended claims, and without the loss of any of its material benefits.

We claim:

1. In a jack, the combination of a supporting-frame, a load lifting and lowering arm fulcrumed on said frame, a handle rockable on said frame in substantially the same vertical plane of movement of said arm, and means connecting said handle and arm selectively causing the latter to rock upwardly or downwardly upon substantially the same downward movement of said handle.

2. In a jack, the combination of a supporting-frame, a load lifting and lowering saddle, an actuating handle on said frame, and operating means between said handle and saddle including gear means, a pawl and ratchet-wheel, friction means between said ratchet-wheel and gear means, and a screw-shaft connection between said ratchet-wheel and gear means, said latter connection tightening said friction means to permit the elevation of the saddle and loosening said friction means to permit the descent of the saddle.

3. In a jack, the combination of a supporting-frame, a load lifting and lowering saddle, an actuating handle on said frame, and operating means between said handle and saddle including an internal-gear segment fulcrumed on the frame, a pinion meshing with said segment, a pawl and ratchet-wheel, friction means between said ratchet-wheel and pinion, and a screw-shaft connection between said ratchet-wheel and pinion, said latter connection tightening said friction means to permit the elevation of the saddle and loosening said friction means to permit the descent of the saddle.

4. In a jack, the combination of a supporting-frame, a load lifting and lowering saddle mounted on said frame, an operating handle on said frame, and actuating means connecting said handle and saddle, including a ratchet-wheel, a double-pawl means on said handle, and means to shift said pawl means to render either of its two pawl parts operative on said ratchet-wheel, whereby the saddle may be selectively raised or lowered during like movements of the handle in the same direction.

5. In a jack, the combination of a supporting-frame, carrying-wheels for said frame, an internal-gear segment fulcrumed on said frame, a load lifting and lowering saddle hinged on an extension of said segment, a link connecting said saddle and frame to maintain substantial horizontality of said saddle, an internally screw-threaded pinion in mesh with said segment and revoluble in said frame, a screw-threaded shaft in said pinion, means to prevent axial movement of said pinion in said frame in one direction, a torsional spring having its opposite ends engaging said pinion and shaft and tending to turn the former on the latter, an actuating ratchet-wheel fixed to said shaft, a holding ratchet-wheel free to turn on said shaft between said actuating ratchet-wheel and said pinion, friction discs between said holding ratchet-wheel and said actuating ratchet-wheel and said pinion, an operating handle fulcrumed on said frame, a double-pawl hinged on said handle, rocking spring means on said handle adapted to render the one or the other end of said double-pawl operative on said actuating ratchet-wheel, a spring-operated pawl coating with said holding ratchet-wheel, and spring means rendered operative when said handle is in an abnormal position tending to withdraw said pawl from said holding ratchet-heel, said handle having a projection overlying said frame whereby the handle when raised sufficiently will lift the frame from the floor permitting the jack to be rolled on said carrying-wheels.

6. In a jack, the combination of a supporting-frame, carrying-wheels for said frame, an internal-gear segment fulcrumed on said frame, a load lifting and lowering saddle hinged on an extension of said segment, a link connecting said saddle and frame to maintain substantial horizontality of said saddle, an internally screw-threaded pinion in mesh with said segment and revoluble in said frame, a screw-threaded shaft in said pinion, means to prevent axial movement of said pinion in said frame in one direction, a torsional spring having its opposite ends engaging said pinion and shaft and tending to turn the former on the latter, an actuating ratchet-wheel fixed to said shaft, a holding ratchet-wheel free to turn on said shaft between said actuating ratchet-wheel and said pinion, friction discs between said holding ratchet-wheel and said actuating ratchet-wheel and said pinion, an operating handle fulcrumed on said frame, a double-pawl hinged on said handle, rocking spring means on said handle adapted to render the one or the other end of said double-pawl operative on said actuating ratchet-wheel, a spring-operated pawl coacting with said holding ratchet-wheel, and spring means rendered operative when said handle is in an abnormal position tending to withdraw said pawl from said holding ratchet-wheel.

7. In a jack, the combination of a supporting-frame, carrying-wheels for said frame, an internal-gear segment fulcrumed on said frame, a load lifting and lowering saddle hinged on an extension of said segment, a link connecting said saddle and frame to maintain substantial horizontality of said saddle, an internally screw-threaded pinion in mesh with said segment and revoluble in said frame, a screw-threaded shaft in said pinion, means to prevent axial movement of said pinion in said frame in one direction, a torsional spring having its opposite ends engaging said pinion and shaft and tending to turn the former on the latter, an actuating ratchet-wheel fixed to said shaft, a holding ratchet-wheel free to turn on said shaft between said actuating ratchet-wheel and said pinion, friction discs between said holding ratchet-wheel and said actuating ratchet-wheel and said pinion, an operating handle fulcrumed on said frame, a double-pawl hinged on said handle, rocking spring means on said handle adapted to render the one or the other end of said double-pawl operative on said actuating ratchet-wheel, and a spring-operated pawl on said frame coacting with said holding ratchet-wheel.

8. In a jack, the combination of a supporting-frame, an internal-gear segment fulcrumed on said frame, a load lifting and lowering saddle actuated by said segment, a pinion oscillatory on said frame and in mesh with the teeth of said segment, a shaft having a screw-threaded connection with said pinion, a pawl and operating ratchet-wheel to turn said shaft, a holding ratchet-wheel free to turn on said shaft, a pawl on said frame coacting with said holding ratchet-wheel, friction means associated with said holding ratchet-wheel, and a torsion spring connected to said shaft and pinion tending to take up slack in said friction means by turning the shaft and pinion relatively to one another.

9. In a jack, the combination of a supporting-frame, a load lifting and lowering member movably mounted on said frame, a movable handle on said frame, friction means to hold said member and its load against descent, and means operated by said handle to cause an alternate decrease and increase in said friction whereby to permit such member and its load to descend step by step.

10. In a jack, the combination of a supporting-frame, a load lifting and lowering member movably mounted on said frame, a movable handle, and operating means between said handle and member including a gear, a shaft having screw-threaded connection with said gear, an actuating ratchet-wheel fixed to said shaft, a pawl co-operating with said ratchet-wheel, a holding ratchet-wheel between said gear and actuating ratchet-wheel and free to turn on said shaft, and a holding pawl coacting with said holding ratchet-wheel, whereby the screw-threaded connection may be tightened to permit the elevation of the load and loosened to effect the descent of the load.

11. In a jack, the combination of a supporting-frame, a load lifting and lowering member movably mounted on said frame, a movable handle, and means whereby said handle may raise and lower said member including a revolubly mounted element, a shaft having a screw-threaded connection with said element, a ratchet-wheel fixed to said shaft, means whereby said handle may turn said ratchet-wheel step by step in either direction, a holding ratchet-wheel free to turn on said shaft adapted to be clamped between said first ratchet-wheel and said element, and a pawl coacting with said holding ratchet-wheel.

12. In a jack, the combination of a supporting-frame, means thereon to raise and lower a load, a handle movably mounted on said frame adapted by its movements both to raise or to lower said means, a holding ratchet-wheel for said means, a pawl on said frame normally cooperating with said ratchet-wheel, and means permitting said handle, when shifted to a position beyond its normal range of movement for raising or lowering the load, to release said holding-pawl from said ratchet-wheel to allow said lowering means to drop to its lowermost position when the load thereon has decreased sufficiently to permit such pawl retraction.

13. In a jack, the combination of a supporting-frame, means thereon to raise and lower a load, a handle movably mounted on said frame adapted by its movements both to raise or to lower said means, a holding ratchet-wheel for said means, a pawl on said frame, a spring tending to hold said pawl in coacting relation with said ratchet-wheel, a second spring associated with said pawl, and means to tension said second spring sufficiently to overpower said first spring when said handle is shifted to a position beyond its normal range of movement for raising or lowering the load, whereby to release said holding pawl from said ratchet wheel to allow said lowering means to drop to its lowermost position when the load thereon is decreased sufficiently to permit such pawl retraction.

14. In a jack, the combination of a supporting-frame, a load lifting and lowering arm fulcrumed on said frame, said arm having an internal-gear segment rigid and movable therewith concentrically with said fulcrum, a saddle on said arm adapted to engage the load, a pinion revoluble on said frame about a fixed axis and in mesh with said segment, an operating-handle fulcrumed on said frame, and actuating means connecting said handle and pinion, whereby the load may be raised or lowered by the rocking of said handle.

15. In a jack, the combination of a supporting-frame, a load lifting and lowering arm fulcrumed on said frame, said arm having an internal-gear segment rigid and movable therewith concentrically with said fulcrum, a saddle on said arm adapted to engage the load, a pinion revoluble on said frame about a fixed axis and in mesh with said segment, an operating-handle fulcrumed on said frame, and actuating means dependent on friction to operatively connect said handle and pinion, whereby the load may be raised or lowered by the rocking of said handle.

16. In a jack, the combination of a supporting-frame, a load lifting and lowering member movably mounted on said frame, a movable operating-handle on said frame, friction-means, a ratchet and pawl load-holding means associated with said friction-means operating-means connecting said handle and member through said friction-means, whereby the load may be raised, and means actuated by said handle to decrease the friction of said friction-means and thereby temporarily render said holding-means inoperative to allow descent of the load.

17. In a jack, the combination of a supporting-frame, a load lifting and lowering member movably mounted on said frame, a movable operating-handle on said frame, actuating means connecting said handle and load-member including friction-means and load-holding means in series relation through which said handle operates to raise the load in which elevated position the load is sustained by said load-holding means, and means operated by said handle to decrease the friction of said friction-means to render said load-holding means temporarily inactive to permit descent of the load.

18. In a jack, the combination of a supporting-frame, a load lifting and lowering member movably mounted on said frame, a movable operating-handle on said frame, actuating means connecting said handle and load-member including friction-means and load-holding means in series relation through which said handle operates to raise the load in which elevated position the load is sustained by said load-holding means, and means operated by said handle to decrease the friction of said friction-means to render said load-holding means temporarily inactive to permit descent of the load, said handle-operated means increasing said friction upon descent of the load to render said load-holding means again operative requiring another actuation of said handle to effect the next descent step of the load, whereby the load may be caused to descend in successive steps.

19. In a jack, the combination of a supporting-frame, a load lifting and lowering member movably mounted on said frame, a movable operating-handle on said frame, actuating means connecting said handle and load-member including friction-means and load-holding means in series relation through which downward movement said handle operates to raise the load in which elevated position the load is sustained by said load-holding means, and means operated by downward movement of said handle to decrease the friction of said friction-means to render said load-holding means temporarily inactive to permit descent of the load, said handle-operated means increasing said friction upon descent of the load to render said load-holding means again operative requiring another downward actuation of said handle to effect the next descent step of the load, whereby the load may be caused to descend in successive steps.

In witness whereof we have hereunto set our hands.

GAILARD E. WEAVER.
HARRY C. BUFFINGTON.